United States Patent [19]
Van Ells

[11] Patent Number: 5,862,633
[45] Date of Patent: Jan. 26, 1999

[54] BUILDING COVER SYSTEM

[76] Inventor: Lynn A. Van Ells, 15 S. Meadow La., Madison, Wis. 53705-5001

[21] Appl. No.: 988,653

[22] Filed: Dec. 11, 1997

[51] Int. Cl.⁶ .................................................. E04D 13/08
[52] U.S. Cl. .................................. 52/16; 52/3; 52/169.5; 52/169.6; 135/95; 135/117
[58] Field of Search .................................. 135/900, 901, 135/117, 95; 52/3, 16, 169.5, 169.6, 169.1

[56] References Cited

U.S. PATENT DOCUMENTS

| | | | |
|---|---|---|---|
| 2,309,149 | 1/1943 | Wood et al. | 405/53 |
| 4,099,346 | 7/1978 | Isono | 49/82 |
| 4,620,397 | 11/1986 | Simpson et al. | 52/66 |
| 4,783,934 | 11/1988 | Langhart et al. | 52/64 |
| 5,234,286 | 8/1993 | Wagner | 405/53 |
| 5,306,210 | 4/1994 | Smit | 454/250 |
| 5,600,923 | 2/1997 | Riley | 52/79.9 |

*Primary Examiner*—Lanna Mai
*Assistant Examiner*—C. Min Choe

[57] ABSTRACT

An auxiliary roof for a building is provided including a building having a perimeter and a roof. A plurality of stanchions includes a pair of rear stanchions and a pair of front stanchions. Top ends of the rear stanchions have an equal height which is greater than that of the top ends of the front stanchions. A frame includes a pair of side members extending downwardly from top ends of the rear stanchions to top ends of the front stanchions. Also included is plurality of slats each defined by a pair of long edges and a pair of short edges, wherein one of the long edges of each slat is coupled between the side members of the frame in spaced parallel relationship. The slats have a raised orientation wherein the same reside at an acute angle for directing air toward the building.

7 Claims, 2 Drawing Sheets

BUILDING COVER SYSTEM

BACKGROUND OF THE INVENTION

1. Field of the Invention

The present invention relates to roof structures and more particularly pertains to a new building cover system for collecting rain water and cooling a building.

2. Description of the Prior Art

The use of roof structures is known in the prior art. More specifically, roof structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art roof structures include U. S. Pat. No. 4,620,397; U.S. Pat. No. 4,528,785; U.S. Pat. No. 4,783,934; U.S. Pat. Des. 249,562; U.S. Pat. No. 4,073,098; and U.S. Pat. No. 4,062,146.

In these respects, the building cover system according to the present invention substantially departs from the conventional concepts and designs of the prior art, and in so doing provides an apparatus primarily developed for the purpose of collecting water and cooling a building.

SUMMARY OF THE INVENTION

In view of the foregoing disadvantages inherent in the known types of roof structures now present in the prior art, the present invention provides a new building cover system construction wherein the same can be utilized for collecting water and cooling a building.

The general purpose of the present invention, which will be described subsequently in greater detail, is to provide a new building cover system apparatus and method which has many of the advantages of the roof structures mentioned heretofore and many novel features that result in a new building cover system which is not anticipated, rendered obvious, suggested, or even implied by any of the prior art roof structures, either alone or in any combination thereof.

To attain this, the present invention generally comprises a building having a perimeter and a roof. A rectilinear cistern is situated underground in a front of the building. The cistern includes a vertically oriented access conduit in communication with the cistern. Such conduit extends upwardly above the ground for access by a user. Next provided is a plurality of stanchions each having a cylindrical configuration with a top end and a bottom end. The stanchions include a pair of front stanchions being hollow and situated adjacent opposed front corners of the perimeter of the building. Each front stanchion has a frusto-pyramidal-pyramidal base coupled a predetermined distance from the bottom end thereof. As such, the bottom end of each front stanchion extends downwardly into the ground and in communication with the cistern. The stanchions further include a pair of rear stanchions situated adjacent opposed rear corners of the perimeter of the building. Each rear stanchion has a frusto-pyramidal base coupled to the bottom end. As such, the top ends of the rear stanchions have an equal height which is greater than that of the top ends of the front stanchions. Also included is a gutter defined by a lower half of a hollow cylinder coupled between the top ends of the front stanchions. Such gutter remains in fluidic communication with the front stanchions for allowing water entering the gutter to be dispensed in the cistern. FIG. 3 shows a rectangular frame coupled between the top ends of each of the stanchions. The frame includes a front member extending along a length of the gutter and a rear member coupled between the top ends of the rear stanchions. Further provided is a pair of side members extending downwardly from top ends of the rear stanchions to top ends of the front stanchions. A plurality of equally sized and shaped slats are provided. Each slat has a planar rectangular configuration defined by a pair of long edges and a pair of short edges. One of the long edges of each slat is pivotally coupled between the side members of the frame in spaced parallel relationship. This allows the slats to reside in a lowered orientation with the slats completely covering the building and allowing water to run off into the gutter. The slats further have a raised orientation wherein the slats reside at an acute angle for directing air toward the building. Finally, a slat control assembly includes a pair of ropes connected between opposite ends of slats adjacent to one of the long edges for effecting the coincident pivoting of the slats. A motor with a spindle mounted thereon is provided for pulling at least one of the ropes for raising the slats to the raised orientation and releasing the at least one of the ropes for lowering the slats to the lowered orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new building cover system apparatus and method which has many of the advantages of the roof structures mentioned heretofore and many novel features that result in a new building cover system which is not anticipated, rendered obvious, suggested, or even implied by any of the prior art roof structures, either alone or in any combination thereof.

It is another object of the present invention to provide a new building cover system which may be easily and efficiently manufactured and marketed.

It is a further object of the present invention to provide a new building cover system which is of a durable and reliable construction.

An even further object of the present invention is to provide a new building cover system which is susceptible of a low cost of manufacture with regard to both materials and labor, and which accordingly is then susceptible of low prices of sale to the consuming public, thereby making such building cover system economically available to the buying public.

Still yet another object of the present invention is to provide a new building cover system which provides in the apparatuses and methods of the prior art some of the advantages thereof, while simultaneously overcoming some of the disadvantages normally associated therewith.

Still another object of the present invention is to provide a new building cover system for collecting water and cooling a building.

Even still another object of the present invention is to provide a new building cover system that includes a building having a perimeter and a roof. A plurality of stanchions includes a pair of rear stanchions and a pair of front stanchions. Top ends of the rear stanchions have an equal height which is greater than that of the top ends of the front stanchions. A frame includes a pair of side members extending downwardly from top ends of the rear stanchions to top ends of the front stanchions. Also included is plurality of slats each defined by a pair of long edges and a pair of short edges, wherein one of the long edges of each slat is coupled between the side members of the frame in spaced parallel relationship. The slats have a raised orientation wherein the same reside at an acute angle for directing air toward the building.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
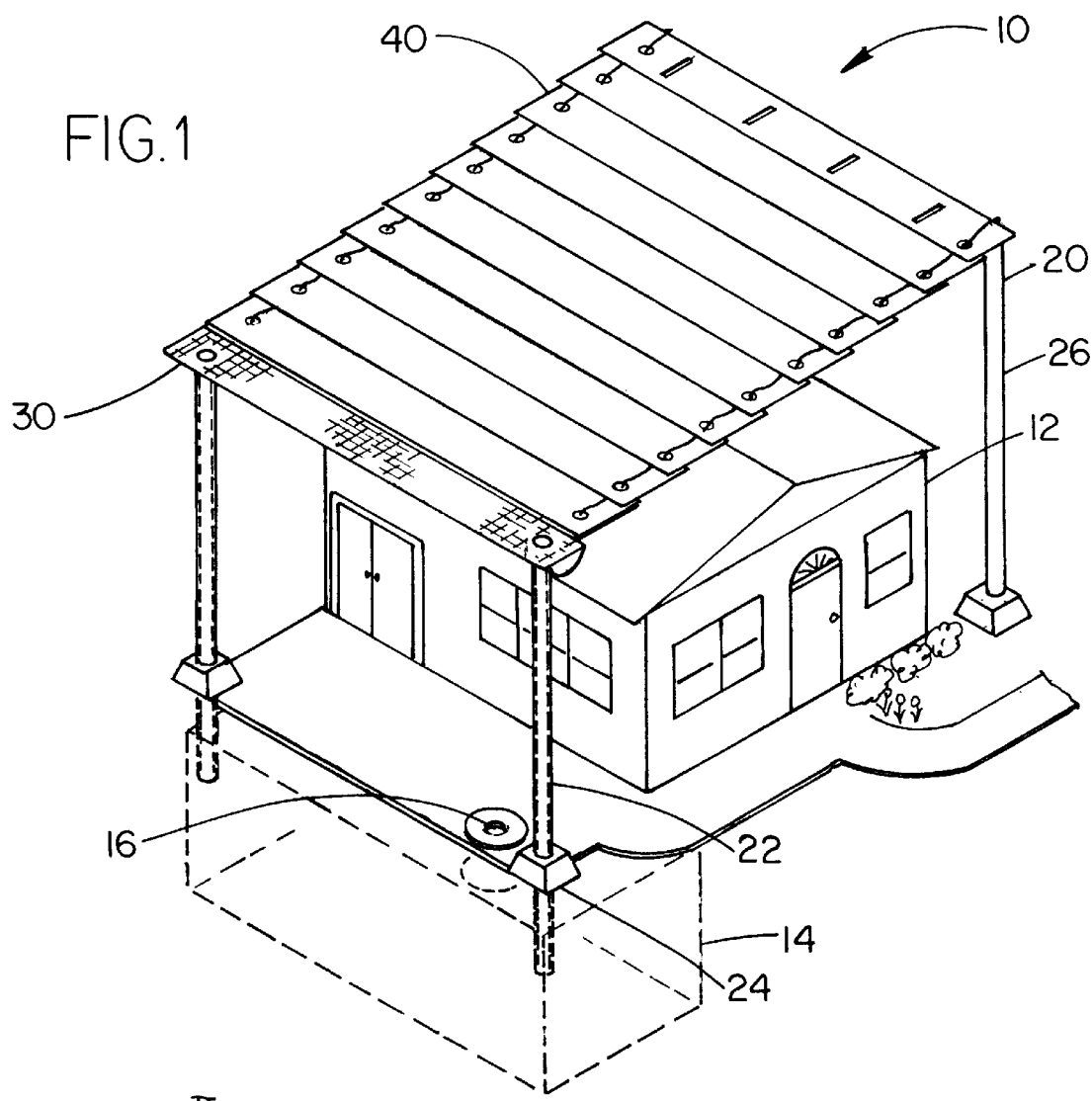
FIG. 1 is a perspective view of a new building cover system according to the present invention.
Figure 2:
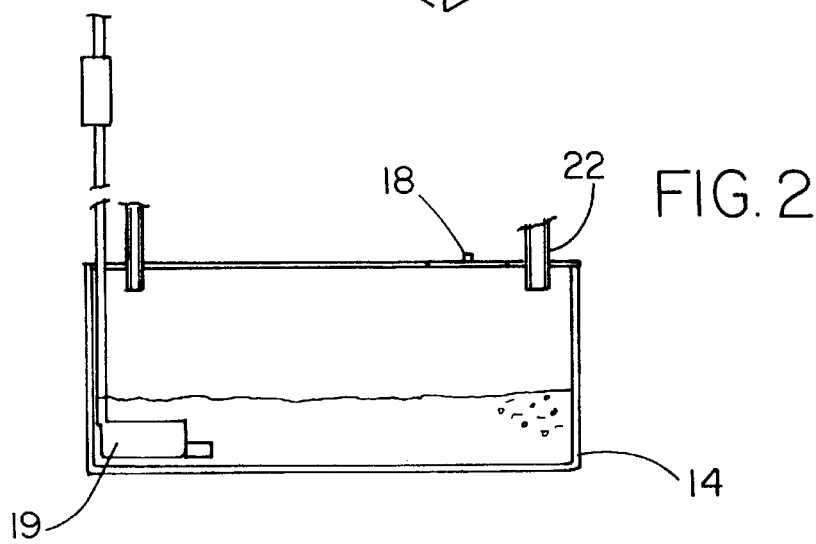
FIG. 2 is a cross-sectional view of the cistern of the present invention.
Figure 3:
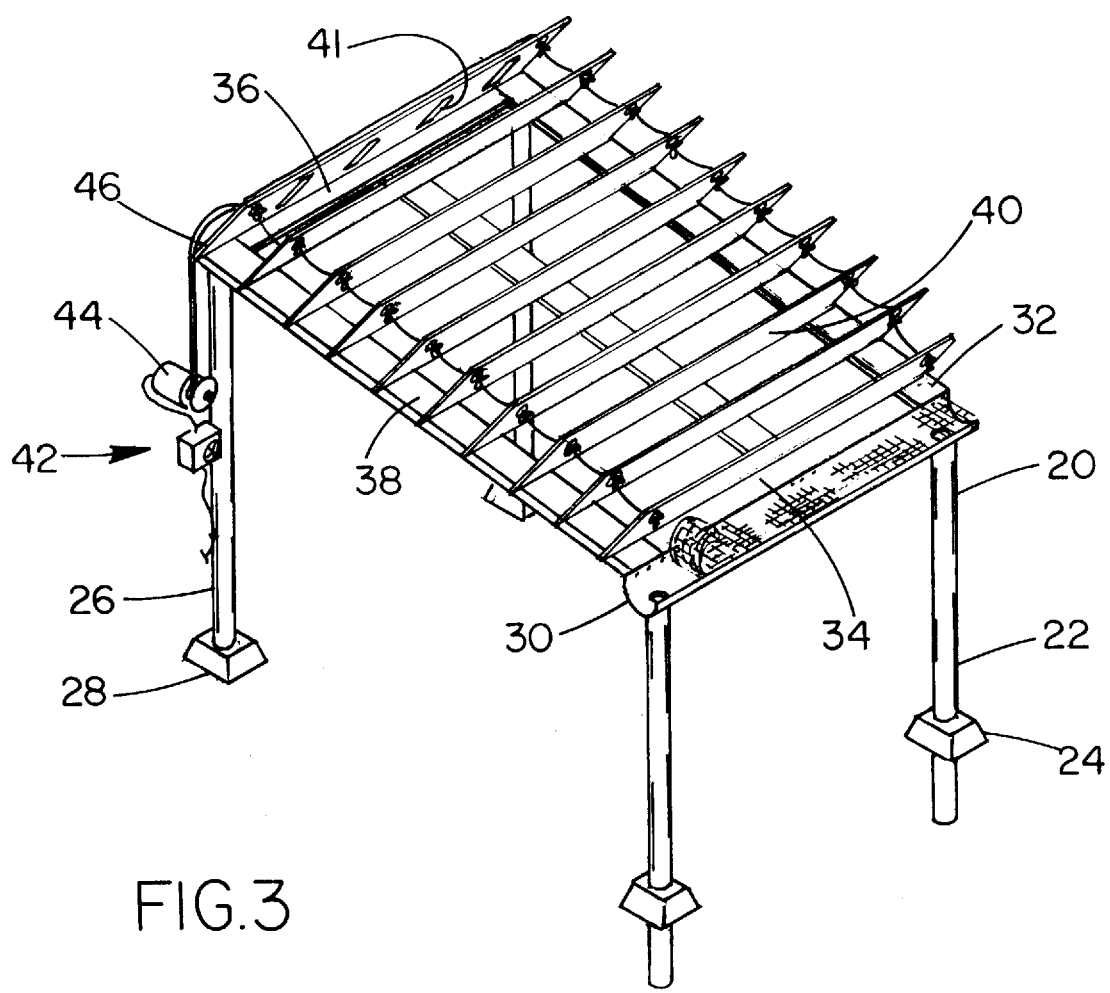
FIG. 3 is a perspective view of the slats of the present invention in a raised orientation.

With reference now to the drawings, and in particular to FIGS. 1 through 3 thereof, a new building cover system embodying the principles and concepts of the present invention and generally designated by the reference numeral 10 will be described.

The present invention, designated as numeral 10, includes a building 12 having a perimeter and a roof. A rectilinear cistern 14 is situated underground in a front of the building. In the alternative, the cistern may be situated above ground. The cistern includes a vertically oriented access conduit 16 in communication with the cistern. Such conduit extends upwardly above the ground for access by a user. A cover 18 may be removably situated over the conduit. Further, the cistern is further equipped with a submersible pump situated therein and connected to a control panel. By this structure, the pump 19 may be selectively employed to disperse water to selected locations for various purposes including irrigation.

Next provided is a plurality of stanchions 20 each having a cylindrical configuration with a top end and a bottom end. The stanchions include a pair of front stanchions 22 being hollow and situated adjacent opposed front corners of the perimeter of the building. In the preferred embodiment, the front stanchions and the front of the building are directed south. Each front stanchion has a frusto-pyramidal base 24 coupled a predetermined distance from the bottom end thereof. During use, the bottom end of each front stanchion extends downwardly into the ground and in communication with the cistern.

The stanchions further include a pair of rear stanchions 26 situated adjacent opposed rear corners of the perimeter of the building. Each rear stanchion has a frusto-pyramidal base 28 coupled to the bottom end. As such, the top ends of the rear stanchions have an equal height which is greater than that of the top ends of the front stanchions.

Also included is a gutter 30 defined by a lower half of a hollow cylinder coupled between the top ends of the front stanchions. Such gutter remains in fluidic communication with the front stanchions for allowing water entering the gutter to be dispensed in the cistern. In the preferred embodiment, a meshed screen is situated over the gutter for preventing debris from entering the front stanchions.

FIG. 3 shows a rectangular frame 32 coupled between the top end of each of the stanchions. The frame includes a front member 34 extending along a length of the gutter and a rear member 36 coupled between the top ends of the rear stanchions. Further provided is a pair of side members 38 extending downwardly from top ends of the rear stanchions to top ends of the front stanchions. Each member takes the form of a planar rectangular plate.

A plurality of equally sized and shaped slats 40 are provided. Each slat has a planar rectangular configuration defined by a pair of long edges and a pair of short edges. One of the long edges of each slat is pivotally coupled between the side members of the frame in spaced parallel relationship. This allows the slats to resided in a lowered orientation with the slats completely covering the building and allowing water to run off into the gutter. The slats further have a raised orientation wherein the slats reside at an acute angle for directing air toward the building. Due to the angled nature of the frame, the slats, in the raised orientation, are vertically offset preferably about 1 inch. As an option, an uppermost slat may be equipped with a plurality of cut outs 41 which serve as heat releasing vents. Further, in alternative embodiments, the slats may be simply fixed in one of the orientations.

Finally, a slat control assembly 42 includes a pair of ropes connected between opposite ends of slats adjacent to one of the long edges for effecting the coincident pivoting of the slats. A motor 44 with a spindle mounted thereon is provided for pulling at least one of the ropes for raising the slats to the raised orientation and releasing the at least one of the ropes for lowering the slats to the lowered orientation. This may be accomplished by a rigid inverted J-shaped pipe 46 to direct the rope appropriately. Various mechanisms may be utilized to automatically actuate the motor. Such mechanisms include a timer, water sensor, and a scheduler. It should be noted that the control assembly may be manipulated from within the building.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary roof for a building comprising, in combination:

a building having a perimeter and a roof;

a rectilinear cistern situated underground in a front of the building, the cistern including a vertically oriented access conduit in communication with the cistern and extending upwardly above the ground for access by a user;

a plurality of stanchions each having a cylindrical configuration with a top end and a bottom end, the stanchions including a pair of front stanchions being hollow and situated adjacent opposed front corners of the perimeter of the building, each front stanchion having a frusto-pyramidal base coupled a predetermined distance from the bottom end thereof such that the bottom end of each front stanchion extends downwardly into the ground and in communication with the cistern, the stanchions including a pair of rear stanchions situated adjacent opposed rear corners of the perimeter of the building, each rear stanchions having a frusto-pyramidal base coupled to the bottom end, wherein the top ends of the rear stanchions have an equal height which is greater than that of the top ends of the front stanchions;

a gutter defined by a lower half of a hollow cylinder coupled between the top ends of the front stanchions and in fluidic communication with the front stanchions for allowing water entering the gutter to be dispensed in the cistern;

a rectangular frame coupled between the top ends of each of the stanchions with a front member extending along a length of the gutter, a rear member coupled between the top ends of the rear stanchions and a pair of side members extending downwardly from top ends of the rear stanchions to top ends of the front stanchions;

a plurality of equally sized and shaped slats each having a planar rectangular configuration defined by a pair of long edges and a pair of short edges, one of the long edges of each slat being pivotally coupled between the side members of the frame in spaced parallel relationship so as to be pivoted between a lowered orientation wherein the slats completely cover the building and allow water to run off into the gutter and a raised orientation wherein the slats reside at an acute angle for directing air toward the building; and a slat control assembly including a pair of ropes connected between opposite ends of slats adjacent to one of the long edges thereof opposite the pivotal coupling for effecting the coincident pivoting of the slats, a motor with a spindle mounted thereon for pulling at least one of the ropes for raising the slats to the raised orientation and releasing the at least one of the ropes for lowering the slats to the lowered orientation.

2. An auxiliary roof for a building comprising:

a plurality of stanchions including a first pair of stanchions and a second pair of stanchions, wherein top ends of the first pair of stanchions have an equal height which is greater than that of the top ends of the second pair of stanchions;

a cover mounted on the top ends of the stanchions for covering the building;

a gutter mounted on the cover and in communication with a cistern;

wherein the gutter is in fluidic communication with the cistern through at least one of the second pair of stanchions.

3. An auxiliary roof for a building as set forth in claim 2 wherein the cover includes a frame with a pair of side members extending between the stanchions and a plurality of slats each defined by a pair of long edges and a pair of short edges, one of the long edges of each slat being coupled between the side members of the frame in spaced parallel relationship, wherein the slats have a raised orientation with the same residing at an acute angle for directing air toward the building, wherein the slats are pivotable to be pivoted between a lowered orientation wherein the slats completely cover the building and allow water to run off into the gutter and the raised orientation wherein the slats reside at the acute angle for directing air toward the building.

4. An auxiliary roof for a building as set forth in claim 2 wherein the cistern is underground.

5. An auxiliary roof for a building as set forth in claim 3 and further including control means for effecting the raising and lowering of the slats.

6. An auxiliary roof for a building as set forth in claim 5 wherein the control mean is automatic.

7. An auxiliary roof for a building comprising:

a plurality of stanchions including a pair of rear stanchions and a pair of front stanchions, wherein top ends of the rear stanchions have an equal height which is greater than that of the top ends of the front stanchions;

a frame with a pair of side members extending downwardly from top ends of the rear stanchions to top ends of the front stanchions;

a plurality of slats each defined by a pair of long edges and a pair of short edges, one of the long edges of each slat being coupled between the side members of the frame in spaced parallel relationship, wherein the slats have a raised orientation with the same residing at an acute angle for directing air toward the building;

wherein the slats are pivotable to be pivoted between a lowered orientation wherein the slats completely cover the building and allow water to run off into the gutter and the raised orientation wherein the slats reside at the acute angle for directing air toward the building;

wherein a gutter is situated between the top ends of the front stanchions for receiving water when the slats are in the lowered orientation;

wherein the gutter is in communication with an cistern;

wherein the gutter is in fluidic communication via the front stanchions.

* * * * *